US005609240A

United States Patent [19]
Moradians

[11] Patent Number: 5,609,240
[45] Date of Patent: Mar. 11, 1997

[54] CONVERTIBLE ROLLER ASSEMBLY FOR LOADING CARGO IN VEHICLE

[75] Inventor: Edward Moradians, Canoga Park, Calif.

[73] Assignee: Ancra International Corporation, Hhawthorne, Calif.

[21] Appl. No.: 546,688

[22] Filed: Oct. 23, 1995

[51] Int. Cl.⁶ .................................................. B65G 13/12
[52] U.S. Cl. ................... 198/782; 193/35 SS; 244/137.1
[58] Field of Search ........................ 198/782; 193/35 R, 193/35 SS, 35 MD; 244/118.1, 137.1

[56] References Cited

U.S. PATENT DOCUMENTS

| | | | |
|---|---|---|---|
| 3,447,665 | 6/1969 | Egeland et al. | 198/782 |
| 3,480,239 | 11/1969 | Jensen et al. | 193/35 R |
| 3,906,870 | 9/1975 | Alberti | 244/137.1 X |
| 4,239,100 | 12/1980 | Corey | 193/35 R |
| 4,462,493 | 7/1984 | Nordstrom | 193/35 R |
| 4,993,899 | 2/1991 | Engel et al. | 244/137.1 X |
| 5,042,633 | 8/1991 | Jenkner | 193/35 SS |
| 5,098,038 | 3/1992 | Hruska et al. | 193/35 SS X |
| 5,316,242 | 5/1994 | Eilenstein-Wiegmann et al. | 244/137.1 |
| 5,346,161 | 9/1994 | Eilenstein-Wiegmann et al. | 244/137.1 |

*Primary Examiner*—James R. Bidwell
*Attorney, Agent, or Firm*—Edward A. Sokolski

[57] ABSTRACT

A roller assembly is removably mounted on the floor of a vehicle. This assembly has a retracted configuration adapted for moving cargo therealong in a first direction and an erected configuration for moving cargo in a second direction normal to the first direction. A first set of rollers is mounted in the assembly for universal movement. A second set of rollers is mounted for rotational movement about a first axis while a third set of rollers is mounted for rotational movement about a second axis normal to said first axis. In the retracted configuration, the first and second set of rollers facilitate the movement of the cargo in the first direction, the third set of rollers being below the support surface of the assembly so as not to interfere with such movement. A sub-assembly on which the third set of rollers is rotatably mounted is spring urged to the erected position by manual release of a latch. In this erected position, the third set of rollers cooperatively operate with the first set of rollers to facilitate movement of the cargo in the second direction.

7 Claims, 5 Drawing Sheets

5,609,240

CONVERTIBLE ROLLER ASSEMBLY FOR LOADING CARGO IN VEHICLE

BACKGROUND OF THE INVENTION

1. Field of the Invention

This invention relates to cargo loading systems for use in loading cargo into a vehicle such as an aircraft and more particularly to a roller assembly which can be converted for moving cargo in either first or second directions normal to each other and which includes a dampener to dampen the impact of loads thereagainst.

2. Description of the Related Art

Roller assemblies which are removably mounted on tracks attached to the floor of a vehicle such as an aircraft or truck are widely used for loading and unloading cargo in such vehicles. Such prior art assemblies are described in U.S. Pat. No. 3,480,239 issued Nov. 25, 1969 to Jensen, et al. and U.S. Pat. No. 4,462,493 issued Jul. 31, 1984 to Nordstrom. Such assemblies of the prior art generally employ rollers mounted in the assembly to facilitate movement of the cargo in a single direction in loading the vehicle. There are situations, however, where in one loading or unloading operation that it is desirable to move the cargo in a first direction while in another such operation in a second direction normal to the first direction. It is desirable that with each such operation movement be facilitated in only a single direction. Such alternate type of operation cannot readily be achieved with assemblies of the prior art without a reinstallation of the assembly on the mounting tracks.

BRIEF SUMMARY OF THE INVENTION

The roller assembly of the present invention can rapidly and easily be converted from a retracted configuration for facilitating the movement of cargo thereon in a first direction to an erected configuration for facilitating the movement of cargo in a direction normal to the first direction.

A first set of rollers is mounted on the floor formed in the assembly for universal rotation; a second set of rollers is mounted in this floor for rotation about a first axis; and a third set of rollers is mounted in such floor for movement about a second axis normal to the first axis.

In the retracted configuration, the first and second set of rollers extend above the assembly floor while the third set of rollers is below the surface of such floor so that movement of cargo in the first direction is facilitated. In the erected configuration, the first and second set of rollers are contacted by the cargo while the second set of rollers is shielded from the cargo so that movement of the cargo is facilitated in the second direction. The second set of rollers is mounted on a sub-assembly which is joined to the main assembly for pivotable motion thereon. This sub-assembly is urged upwardly by a spring to an erected position whereat it stands normal to the floor formed by the main assembly. In its erected position, the sub-assembly shields the second set of rollers from the cargo. The sub-assembly has dampeners incorporated therein for dampening the force of cargo impacting thereagainst, particularly during unloading operations when the sub-assembly may be employed as an alignment stop. The sub-assembly can be manually depressed against the spring action to bring it to a retracted position in the plane of the floor of the main assembly where it is latched in position by a latching mechanism. The latching mechanism can be manually released to permit the spring to drive the sub-assembly back to the erected position.

It is therefore an object of the invention to facilitate the conversion of a vehicle roller assembly from a first configuration for handling cargo movement in a first direction to a second configuration for handling cargo movement in a direction normal to the first direction and acting as a stop member.

It is a further object of the invention to provide an improved roller assembly for loading and unloading cargo in vehicles which can be readily converted to handle cargo movement in either one of two mutually perpendicular directions.

Other objects of the invention will become apparent in connection with the following description in conjunction with the accompanying drawings.

DETAILED DESCRIPTION OF TEE INVENTION

Figure 1:
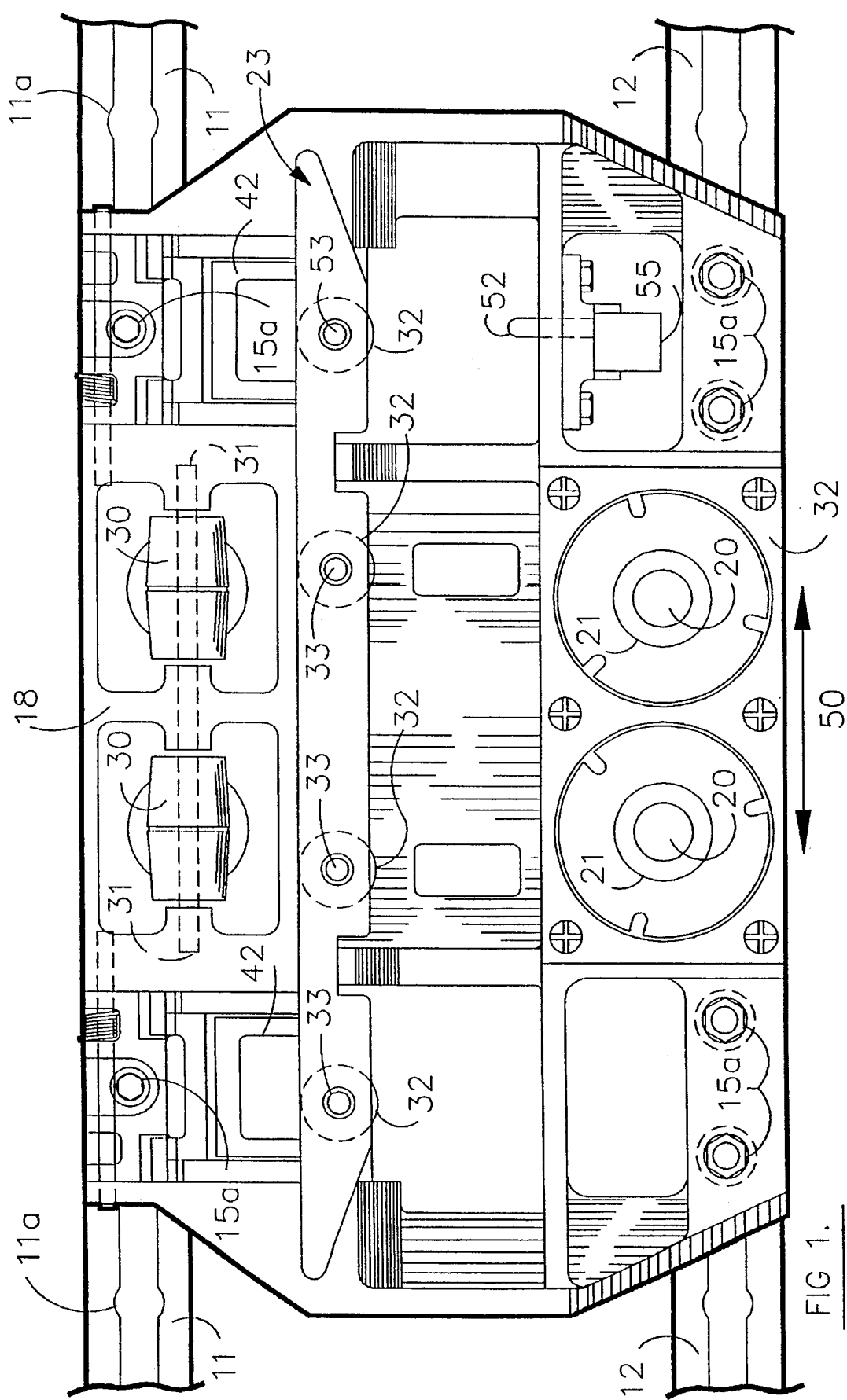
FIG. 1 is a top plan view of a preferred embodiment of the invention shown in its erected configuration.
Figure 2:
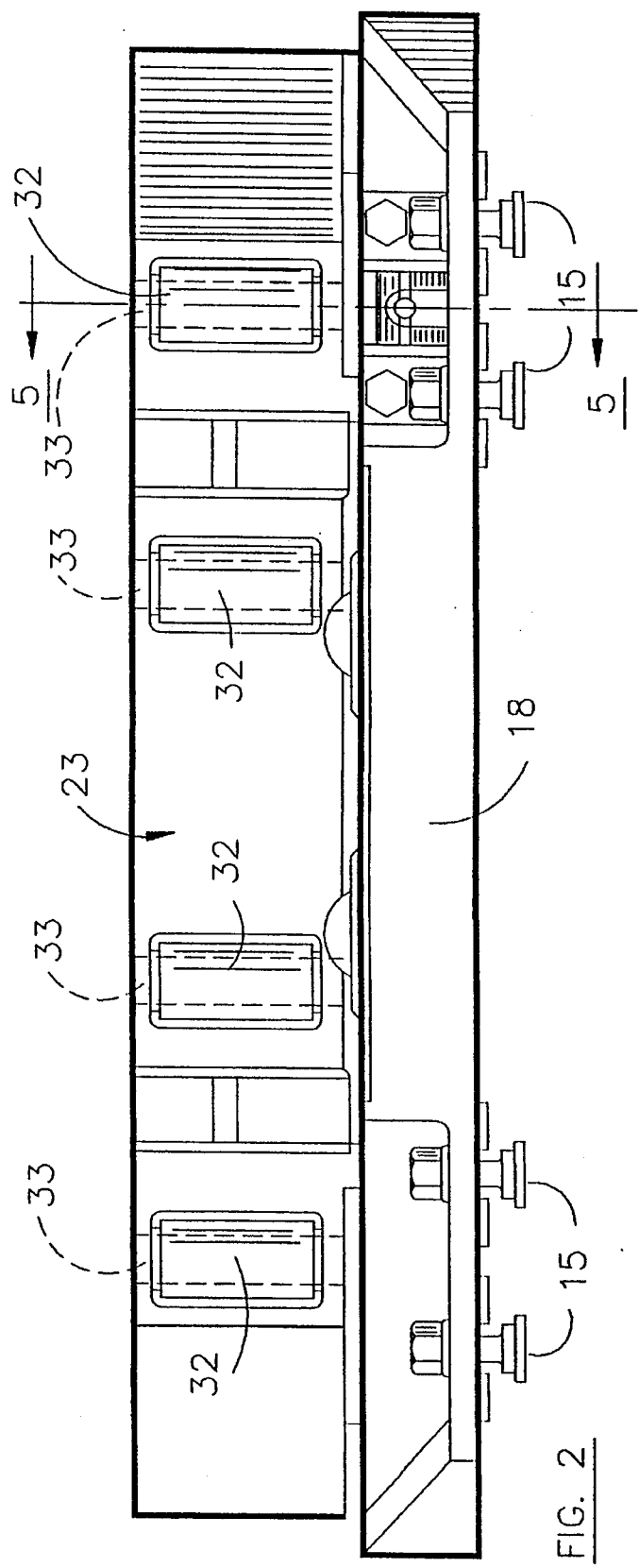
FIG. 2 is a front elevational view of the preferred embodiment in its erected configuration.

Referring to FIGS. 1–5, the preferred embodiment of the invention is shown in its erected configuration.

The assembly is removably mounted on a pair of tracks 11 and 12 by means of lugs 15 which can be fitted into the tracks at the widened rounded openings 11a and then slid along the tracks to a narrow portion thereof and tightened thereto by means of nuts 15a. This type of attachment is well known in the art and is described, for example, in U.S. Pat. No. 3,480,239 issued Nov. 25, 1969 to Jensen, et al.

The assembly has a floor portion 18 which provides a support for the cargo. A first set of rollers 20 which are in the form of balls are mounted for universal rotation in bearings 21, which are attached to floor 18. A second set of rollers 30 are mounted on floor 18 for rotation about a first axis. A third set of rollers 32 are mounted on sub-assembly 23 for rotation about second axes 33 which are normal to the first axis. Sub-assembly 23 is pivotally supported on rod 37 by means of sleeve bearings 39 formed in the sub-assembly. Rod 37 is fixedly attached to the main assembly. A pair of torsion springs 40 are supported on rod 37. One end of each of the springs engages the sub-assembly while the other end engages the floor portion of the assembly thereby urging the sub-assembly to an erect position as shown in the Figures. A pair of stop assemblies are each formed by a first member 42 pivotally mounted on sub-assembly 23 and a second member 43 pivotally mounted on rod 44 attached to the main assembly. Member 43 is spring urged against member 42 by means of spring 45, and is driven by spring 45 to a retracted position on the floor when the sub-assembly is manually retracted.

Figure 5:
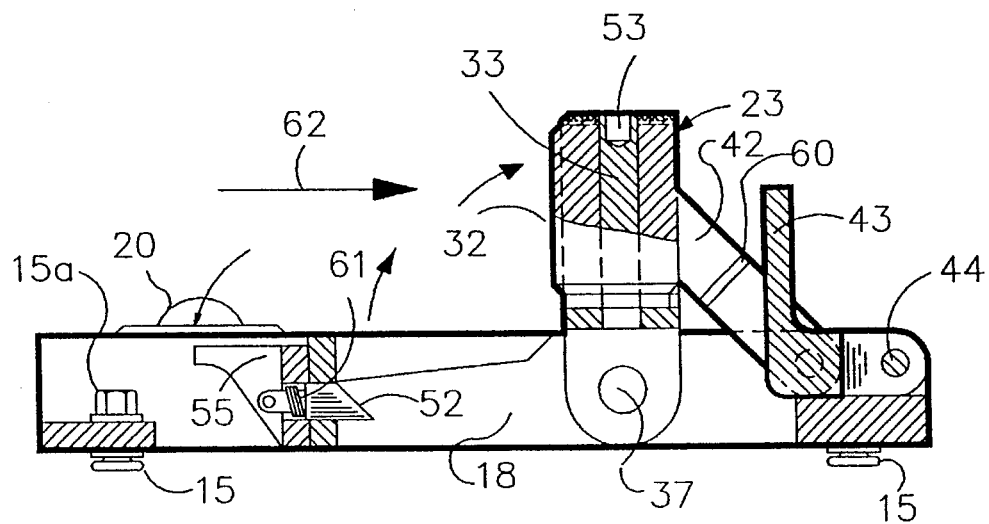
FIG. 5 is a cross sectional view taken along the plane indicated by 5—5 in FIG. 2.
Figure 5A:
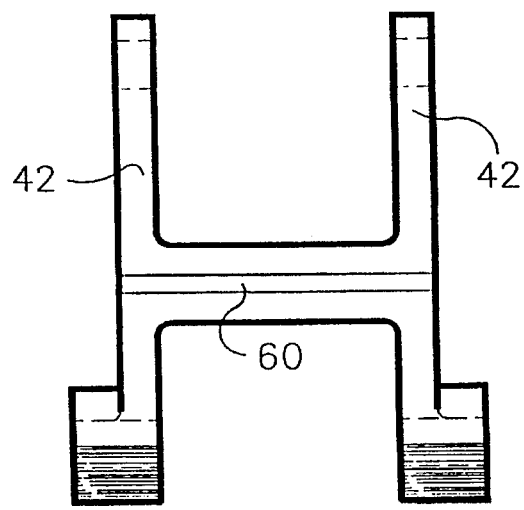
FIG. 5A is a view showing the dampener of the sub-assembly of the invention.

With the assembly in its erected configuration, as shown in FIGS. 1–5, cargo can be readily moved in the directions indicated by arrows 50 with the cargo moving along universal rollers 20 as well as rollers 32. As can be seen, in this configuration rollers 30 are shielded from an interaction with the cargo by the blocking action of sub-assembly 23. As can be seen in FIGS. 5 and 5A, a dampener 60 which may be of urethane is installed in member 42 to absorb the impact of loads which strike against sub-assembly 23, particularly in unloading.

Figure 7:
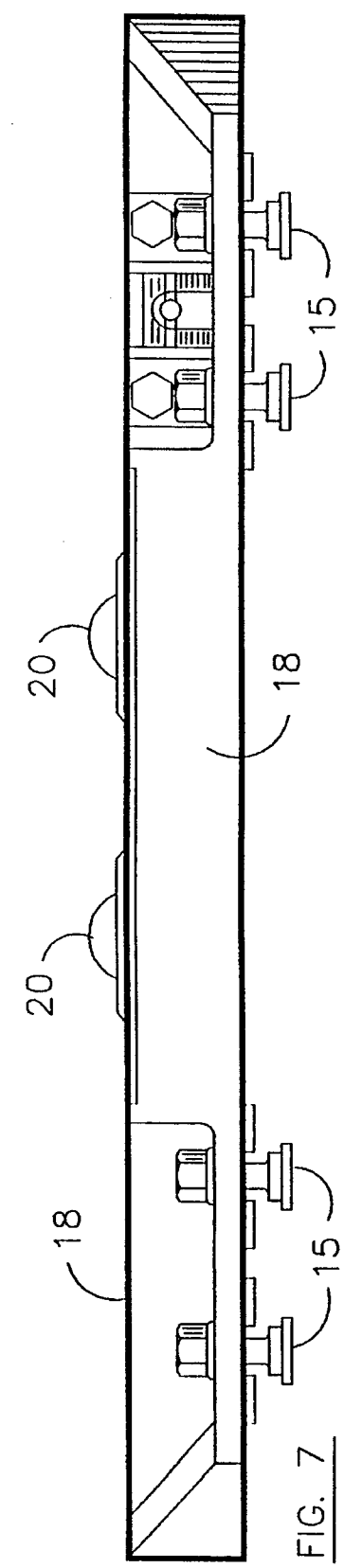
FIG. 7 is a front elevational view of the preferred embodiment in its retracted configuration.
Figure 4:
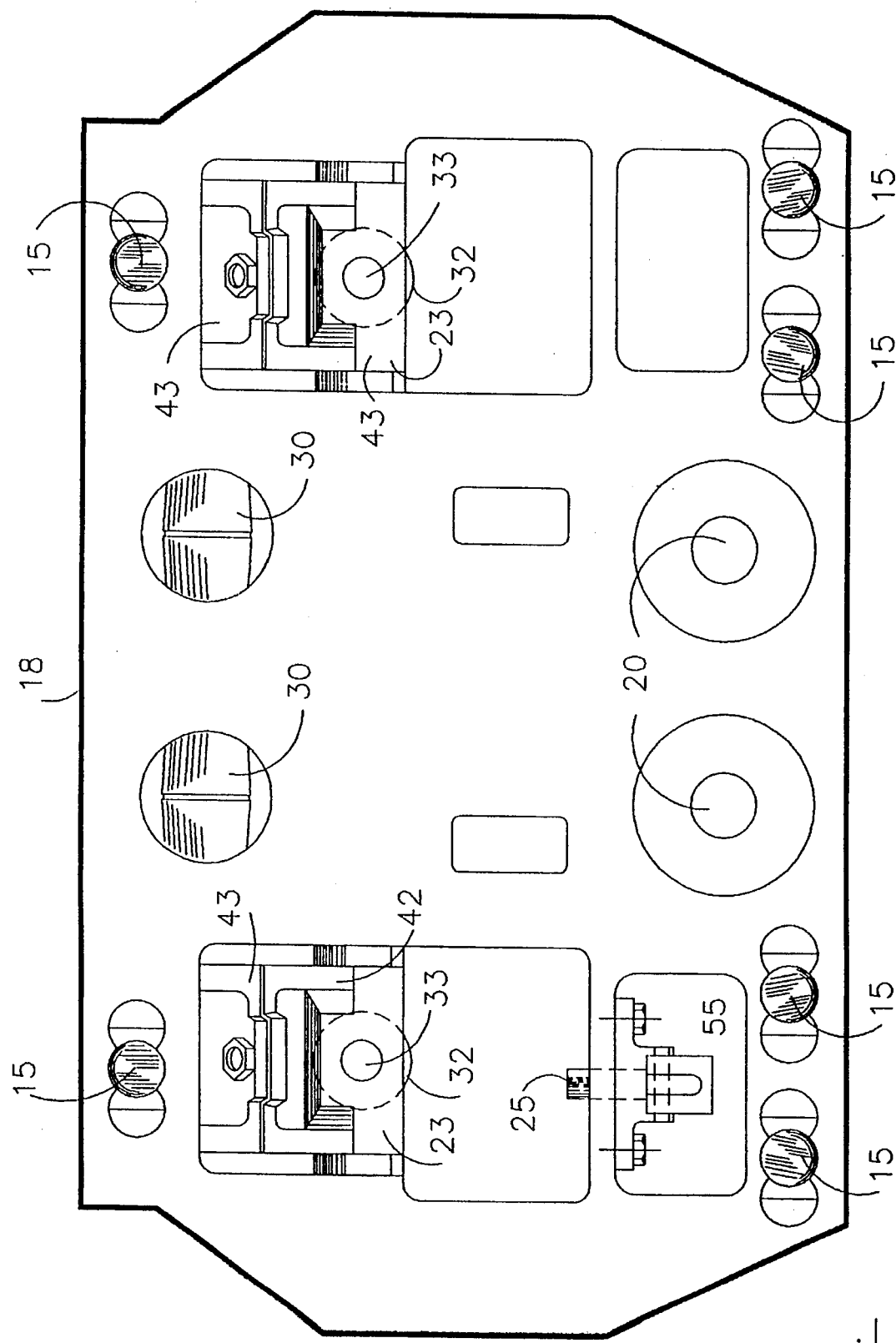
FIG. 4 is a bottom plan view of the preferred embodiment in its erected configuration.
Figure 3:
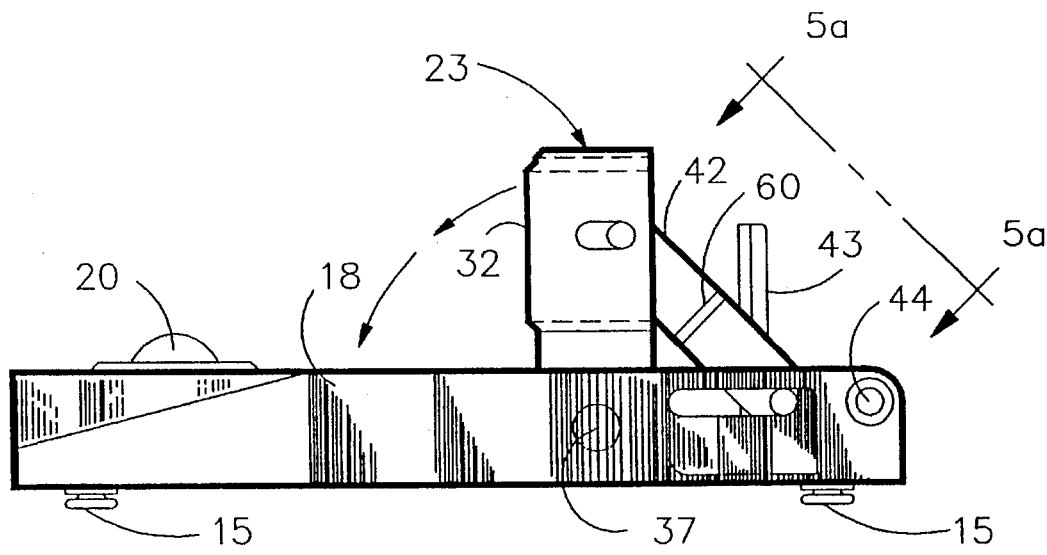
FIG. 3 is a right hand elevational view of the preferred embodiment in its erected configuration.
Figure 6:
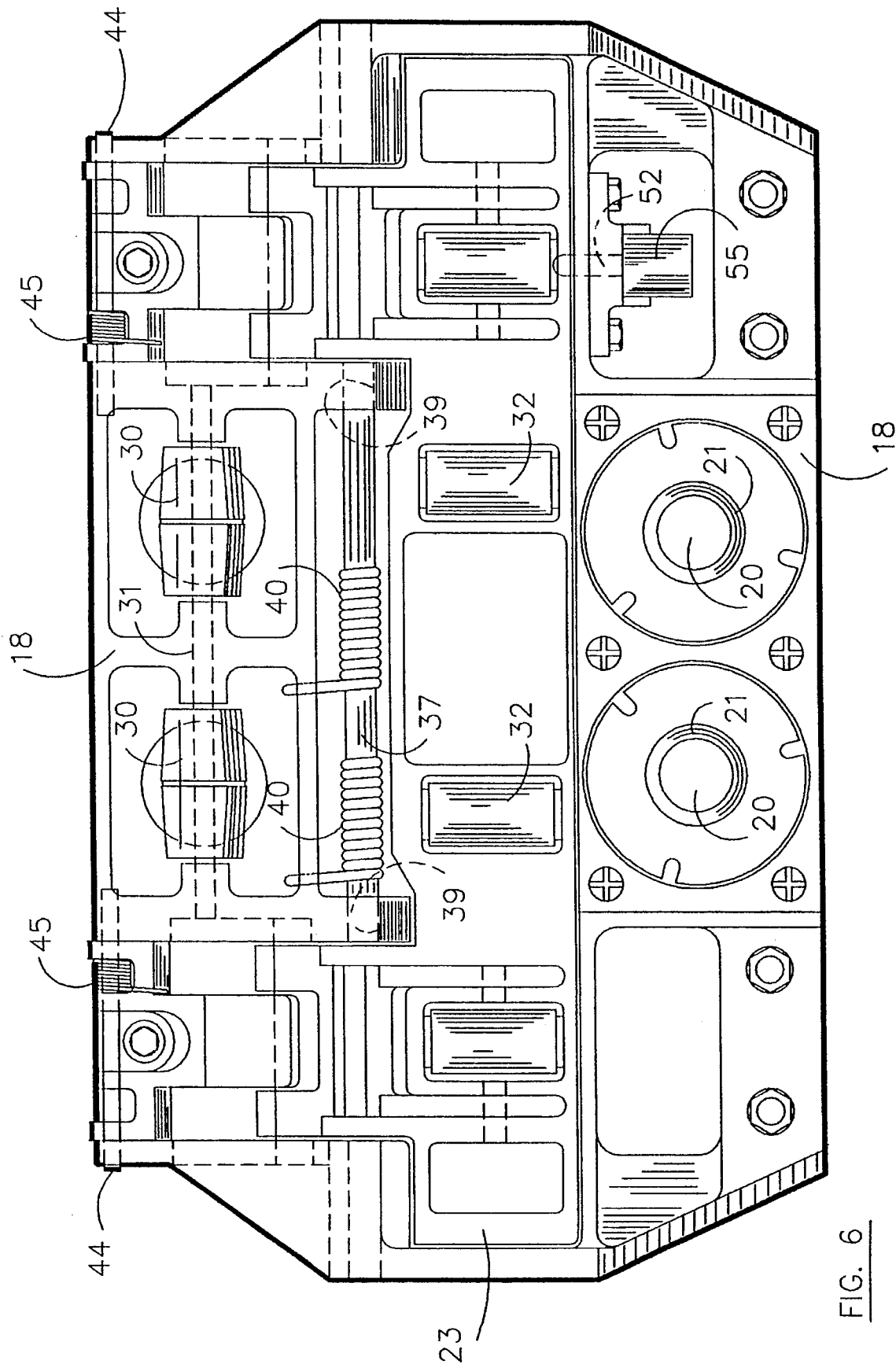
FIG. 6 is a top plan view of the preferred embodiment shown in its retracted configuration.

Referring now to FIGS. 6 and 7, the assembly is brought to its retracted configuration by manually depressing sub-assembly 23 against the spring tension of springs 40. When the sub-assembly reaches its fully depressed or retracted position, it is latched in this retracted position by means of detent arm 52 mounted on the main assembly which engages indented portion 53 of the sub-assembly. Detent arm 52 is urged into the indented portion 53 by spring 61 (see FIG. 5). In the retracted configuration, the third set of rollers 32 are below the surface of the floor formed by the assembly so that they do not engage the cargo. It is to be noted in this regard that opposite sides of the sub-assembly 23 face the cargo in the erected and retracted configurations, rollers 32 being mounted so that they are above the sub-assembly surface on one side and below such surface on the opposite side.

The assembly is changed from its retracted configuration as shown in FIG. 6 to its erected configuration as shown in FIG. 1 by manually actuating lever 55. This operates to withdraw detent arm 52 from indented portion 53, thereby permitting springs 40 to drive the sub-assembly to its erect position.

The roller assembly of the invention can be used in unloading cargo in the direction indicated by arrow 62(FIG. 5). With the assembly in its erected configuration as shown in FIG. 5, the cargo is moved until it impacts against rollers 32 where it is positioned adjacent to the exit door. The cargo is then moved laterally along the rollers until it is opposite the door through which it is unloaded.

While the invention has been described and illustrated in detail, it is to be clearly understood that this is intended by way of example only and is not to be taken by way of limitation, the scope of the invention being limited only by the terms of the following claims.

I claim:

1. A roller assembly for loading and unloading cargo in a vehicle having a retracted configuration for facilitating the movement of cargo therealong in a first direction and an erected configuration for facilitating the movement of cargo therealong in a second direction normal to the first direction comprising:

a floor (18) formed in said assembly, a first set of rollers (20) mounted on said floor for universal rotation, a second set of rollers (30) mounted on said floor for rotation about a first axis, said assembly including a main assembly portion and a sub-assembly portion (23) mounted pivotally on said main assembly portion, a third set of rollers (32) mounted on said sub-assembly portion (23) for rotation about a second axis normal to said first axis, said third set of rollers being above the surface of one side of said sub-assembly portion (23) and below the surface of the side of said sub-assembly portion (23) opposite said one side thereof, means (40) for driving said sub-assembly portion (23) from a retracted position forming part of the floor (18) to an erected position standing upwardly normal to said floor (18, said roller assembly being in the retracted configuration for facilitating the movement of cargo in the first direction when the sub-assembly portion (23) is in a retracted position whereat the cargo rides on said first and second set of rollers (20,30) and the side of said sub-assembly (23) opposite said one side thereof and the third set of rollers (32) are opposite the cargo with the third set of rollers (32) beneath the surface of the side of the sub-assembly (23) opposite said one side thereof and in the erected configuration for facilitating the movement of cargo in said second direction when said sub-assembly portion (23) is in an erected position whereat the cargo rides on said first set of rollers (20) and against said third set of rollers (32).

2. The roller assembly of claim 1 wherein said means for driving said sub-assembly portion from the retracted position to the erected position comprises a spring urging the sub-assembly upwardly, and further including means for releasably latching said sub-assembly in the retracted position.

3. The roller assembly of claim 1 wherein when the sub-assembly portion is in the erected position, said first and third set of rollers are on one side of said sub-assembly and the second set of rollers is on the side of said sub-assembly opposite to said one side thereof, said sub-assembly thereby shielding the second set of rollers from the cargo.

4. The roller assembly of claim 1 wherein in the retracted configuration said third set of rollers is below the surface of the floor.

5. The roller assembly of claim 1 wherein the rollers of the first set of rollers are in the form of balls.

6. The roller assembly of claim 1 wherein said sub-assembly portion includes dampener means for dampening the impact of cargo thereagainst.

7. The roller assembly of claim 6 wherein said sub-assembly portion includes a stop assembly, said dampener means comprising a dampener member installed in said stop assembly.

* * * * *